United States Patent [19]
Jordan et al.

[11] Patent Number: 5,562,222
[45] Date of Patent: Oct. 8, 1996

[54] TEMPORARY COVER FOR ELECTRICAL OUTLET BOXES

[75] Inventors: Raymond L. Jordan, Reno, Nev.; Paul Shilinsky, 619 Nixon Ave., Reno, Nev. 89509

[73] Assignee: Paul Shilinsky, Reno, Nev.

[21] Appl. No.: 355,695

[22] Filed: Dec. 14, 1994

[51] Int. Cl.⁶ .................................................. B65D 25/18
[52] U.S. Cl. ........................... 220/3.8; 220/307; 220/771
[58] Field of Search ................................. 220/318, 354, 220/356, 306, 307, 771

[56] References Cited

U.S. PATENT DOCUMENTS

| | | | |
|---|---|---|---|
| 1,883,457 | 10/1932 | Arnold . | |
| 1,935,565 | 11/1933 | Goetzelman . | |
| 1,956,196 | 4/1934 | Korab . | |
| 2,204,006 | 6/1940 | Allen et al. . | |
| 2,559,151 | 7/1951 | Getzoff . | |
| 2,815,144 | 12/1957 | Kullander . | |
| 4,163,503 | 8/1979 | McKinnon | 220/3.8 |
| 4,293,173 | 10/1981 | Tricca . | |
| 4,478,349 | 10/1984 | Haverland, Jr. et al. | 220/771 |
| 4,623,753 | 11/1986 | Feldman et al. | 220/3.8 |
| 4,863,059 | 9/1989 | Christensen | 220/3.8 |
| 4,896,784 | 1/1990 | Heath | 220/3.8 |
| 5,009,610 | 4/1991 | Woskow . | |
| 5,265,743 | 11/1993 | Frohn | 220/771 |
| 5,360,130 | 11/1994 | Lehmann et al. | 220/3.8 |
| 5,386,922 | 2/1995 | Jordan | 220/771 |

*Primary Examiner*—Joseph M. Moy
*Attorney, Agent, or Firm*—Richard C. Litman

[57] ABSTRACT

A temporary cover for electrical outlet boxes provides for sealing such boxes during the finishing stages of building construction, for plastering and wallboard work on interior walls and the like. The cover comprises a very thin sheet of continuous, unbroken material having an inwardly extending flange which is sized to frictionally engage the inner surfaces of the walls of the outlet box. The cover is pressed into place in the box opening, and plastering or wallboard joint compound work may be performed without possibility of contaminating the electrical box with plaster, wallboard joint compound, or similar materials, and/or possibly completely filling the box with the subsequent problems of locating the concealed box and/or accessing wiring or other components therein which have been covered by plaster or other material. The cover may be removed easily by an inwardly protruding grip, and may be economically discarded after a single use due to its construction of thin vacuum formed plastic or the like. Advertising or other messages may be applied to the surface of the opaque, translucent or transparent cover, and the cover may be made of transparent materials in order that persons may view any wiring or components within the electrical box.

11 Claims, 3 Drawing Sheets

TEMPORARY COVER FOR ELECTRICAL OUTLET BOXES

FIELD OF THE INVENTION

The present invention relates generally to the building construction field, and more specifically to an inexpensive, disposable cover for temporarily sealing electrical receptacle and switch boxes and the like during plastering and finishing operations, to preclude contamination of the electrical receptacle box with plaster or wallboard joint compound.

BACKGROUND OF THE INVENTION

In conventional building and dwelling construction, electrical wiring and receptacle boxes are installed within the framework of the structure prior to the installation of the interior wall surfaces. Once the electrical, plumbing, gas, etc. lines are installed within the wall structure, the interior wall panels are installed. Generally, these panels are gypsum wallboard (e.g., Drywall, tm) and use a viscous, relatively rapidly curing joint compound to smooth and seal joints, corners, and other discontinuities and irregularities in the panels, including the gaps between the panels and any electrical receptacle boxes or the like installed within the walls. In some cases, the entire interior wall surfaces may be built up of lath strips and plastered thereover, which construction technique still results in the use of a viscous material applied around the electrical switch and outlet boxes, which material (plaster) may enter an electrical box which is not otherwise protected or covered.

In either case, the plasterers or persons applying the joint compound must work quickly, and often apply the plaster or compound over the previously installed electrical boxes, at least contaminating the interiors of the boxes and making it difficult to access any wiring installed therein for the installation of the electrical components, and in some cases completely covering over the boxes to the point that they are extremely difficult to locate and "dig out" later in order to complete the installation of the electrical fixtures therein.

Accordingly, the need arises for a temporary cover which may be applied over such electrical receptacle and switch boxes and the like, which cover is inexpensive and economically disposable after use. The cover should be formed of a very thin sheet of material and should be sized to be captured frictionally within standard sizes of electrical receptacle boxes and the like, with no more than the thickness of the cover sheet material protruding past the plane of the wall surface, in order to provide as little disruption as possible during the plastering or other operations of the wall. Means should be provided for ease of removal of the cover when it is no longer needed, and alternative means should be provided for additional installation security of the cover to the electrical box, if required. The temporary cover may be formed of opaque materials, or alternatively may be formed of a clear or translucent plastic sheet, so that workers may view the interior of an electrical box or the like covered thereby. Finally, as the temporary cover is relatively inexpensive and economically disposable, the cover may include an advertising or other message or instructions thereon, in order to provide for distribution in the construction trade as advertising means.

DESCRIPTION OF THE PRIOR ART

U.S. Pat. No. 1,883,457 issued to Harry S. Arnold on Oct. 18, 1932 discloses an Outlet Box adapted for installation in a poured concrete ceiling structure. The box is specially shaped to provide for ease of "fishing" or drawing electrical wiring therethrough, by reducing the angular degree of the corners and bends such wiring must make. A cover plate is disclosed, but the plate is a flat sheet of material which does not engage with the wall edges of the box, as does the present cover. Moreover, the cover is apparently formed of the same material as the (preferably metal) box, unlike the thin plastic material of which the present cover is preferably formed. No means providing for ease of removal is disclosed by Arnold, as provided by the present invention.

U.S. Pat. No. 1,935,565 issued to William Goetzelman on Nov. 14, 1933, discloses a Temporary Cover For Switch Boxes comprising a resilient metal plate having opposite hooks outwardly positioned thereon, which hooks engage inwardly turned edges of the front opening or cap of a switch box to provide a cover therefor. The hooks are punched in the surface of the cover, thus providing holes which may be filled with plaster and thus create difficulty in moving the hooks relative to the box opening edges to remove the cover. The present covers do not rely upon hooks or other mechanical engagement, but rather rely upon frictional engagement with the inner edge surfaces of the parallel side walls of the standard electrical box, rather than inwardly turned edges of a front opening. As in the conventional cover of Arnold discussed above, Goetzelman provides no means to grip the cover for removal from the box, when removal is desired.

U.S. Pat. No. 1,956,196 issued to Harry E. Korab on Apr. 24, 1934, discloses a Shield For Outlet Boxes comprising a box-like structure which engages the interior of an electrical switch or receptacle box, and protrudes outward a significant distance to preclude covering of the cover structure with plaster or the like. The device is formed of a single folded and cut sheet of heavy paper material or the like, and relies upon notches in opposite ends of side members to engage the inwardly turned edges of the front cap of the electrical box. The securing means used by Korab is thus unlike that of the present invention, and the protruding box-like structure of the Korab cover would preclude the smooth application of plaster or drywall thereabout, as the plasterer or worker would have to work around the protruding structure, unlike the present invention which mounts essentially flush to the outlet.

U.S. Pat. No. 2,204,006 issued to Edward N. Allen et al. on Jun. 11, 1940, discloses an Outlet Box Closure formed substantially of rubber or the like, but also including metal projections and pins extending oppositely therefrom. The device is installable in a conventional electrical outlet or switch box devoid of a front cover or surface, but includes a protruding knob providing a grip for the removal of the device from the electrical box. The same problem with the protrusion exists here as with the Korab device discussed above, and moreover, the combination of rubber and metal materials renders the Allen et al. cover relatively complex and costly to manufacture and sell, thereby practically dictating its cleaning and reuse after an application. The present temporary cover is readily disposable, being formed of a single, unitary, unbroken sheet of thin plastic material or the like, and having no protrusions to cause difficulty in applying plaster or the like.

U.S. Pat. No. 2,559,151 issued to Edward M. Getzoff on Jul. 3, 1951, discloses a Safety Guard For Electrical Outlets, comprising two blades pivotally attached to an electrical outlet cover plate by the central cover plate attachment screw. The blades are adapted only to cover the electrical receptacles themselves, as the outlet box is already covered by the cover plate. The present invention secures to the underlying electrical box, rather than to a receptacle cover plate, as such a cover plate would not be installed at the time the present invention is used.

U.S. Pat. No. 2,815,144 issued to Henning E. Kullander on Dec. 3, 1957, discloses a Locating Guard For Electrical Outlet Receptacles comprising an assembly of rigid and flexible sheets of material, e.g., thin sheet metal and paper stock or the like, thus rendering the device somewhat more complex to manufacture than the present invention. The Kullender device includes opposite flanges which are stapled to the center cover portion, and which flanges are folded to extend outward from the center portion and from the box and wall after the device is installed within the box. While the flexible (preferably paper) flanges are intended to bend when struck by a plastering trowel or the like, it would appear that these protrusions could cause such a trowel to catch on them, and inadvertently pull the device from the box; much the same potential problem exists with the Korab, and to a lesser extent the Allen, devices discussed above. The present invention is formed of a single, unitary thin sheet of material, and has no protrusions extending from the box with the exception of the thickness of the sheet material itself, thus precluding the potential hazard of a trowel catching on the device and inadvertently pulling it from its installed position in the electrical box.

U.S. Pat. No. 4,293,173 issued to Raymond A. Tricca on Oct. 6, 1981, discloses an Electrical Outlet Insulation System comprising a sheet of foam material which is permanently installed behind the cover plate of an electrical outlet, in order to provide thermal insulation. Other smaller sheets are provided to seal the outlet sockets themselves. As the sheets are all discontinuous, with the main sheet having holes therethrough to access the electrical sockets therebehind and the smaller socket covers having passages providing for the blades of an electrical plug to pass therethrough, the Tricca insulating covers cannot preclude passage of material therethrough. Moreover, the flexible nature of the foam material would allow the sheet(s) to be moved easily in comparison to the present covers. Furthermore, the primary sheet is secured by a central hole and a screw engaging an electrical receptacle installed within the box. Generally, no electrical receptacle is installed at the time of use of the present cover.

Finally, U.S. Pat. No. 5,009,610 issued to Robert Woskow on Apr. 23, 1991, discloses a Light Switch And Outlet Guard, wherein one embodiment comprises a generally elongate cover pivotally installed on an outlet cover plate using the standard center screw. The device is intended to block access to the underlying electrical receptacles. The Woskow device does not cover the entire front of the electrical box, and cannot be used in the environment of the present invention due to the:need for attachment to the electrical receptacle, which is not installed in the box at the time of use of the present invention.

None of the above noted patents, taken either singly or in combination, are seen to disclose the specific arrangement of concepts disclosed by the present invention.

SUMMARY OF THE INVENTION

By the present invention, an improved temporary cover for electrical outlet boxes is disclosed.

Accordingly, one of the objects of the present invention is to provide an improved temporary electrical box cover which provides for the sealing of such electrical switch and receptacle boxes and the like, from plaster, wallboard joint compound, and other contaminants during their application in building construction.

Another of the objects of the present invention is to provide an improved temporary electrical box cover which is formed of a continuous, unbroken, relatively thin sheet of material, devoid of protrusions which would extend from the plane of the wall surface and electrical outlet box to which the cover is installed.

Yet another of the objects of the present invention is to provide an improved temporary electrical box cover which includes an inwardly extending flange which at least some portions thereof are adapted to frictionally engage the outward portions of the side walls of the electrical box.

Still another of the objects of the present invention is to provide an improved temporary electrical box cover which includes cover means for the standard screw holes provided in such electrical boxes for the attachment of electrical components thereto, and which further includes guides in the screw hole cover portions providing for the installation of screws therethrough to secure the temporary cover to the electrical box, if desired.

A further object of the present invention is to provide an improved temporary electrical box cover which may include grip means to facilitate removal of the cover from the electrical box.

An additional object of the present invention is to provide an improved temporary electrical box cover which may be vacuum formed of thin plastic sheet material, to provide an extremely inexpensive cover which may be economically discarded after a single use.

Another object of the present invention is to provide an improved temporary electrical box cover which may be formed of opaque or transparent materials, with such transparent covers providing a view of any wiring or other components installed within an electrical box over which the present cover is installed.

Yet another object of the present invention is to provide an improved temporary electrical box cover which may include one or more messages thereon, relating to advertising, instructions for use, and/or other messages, to provide further utility.

A final object of the present invention is to provide an improved temporary electrical box cover for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
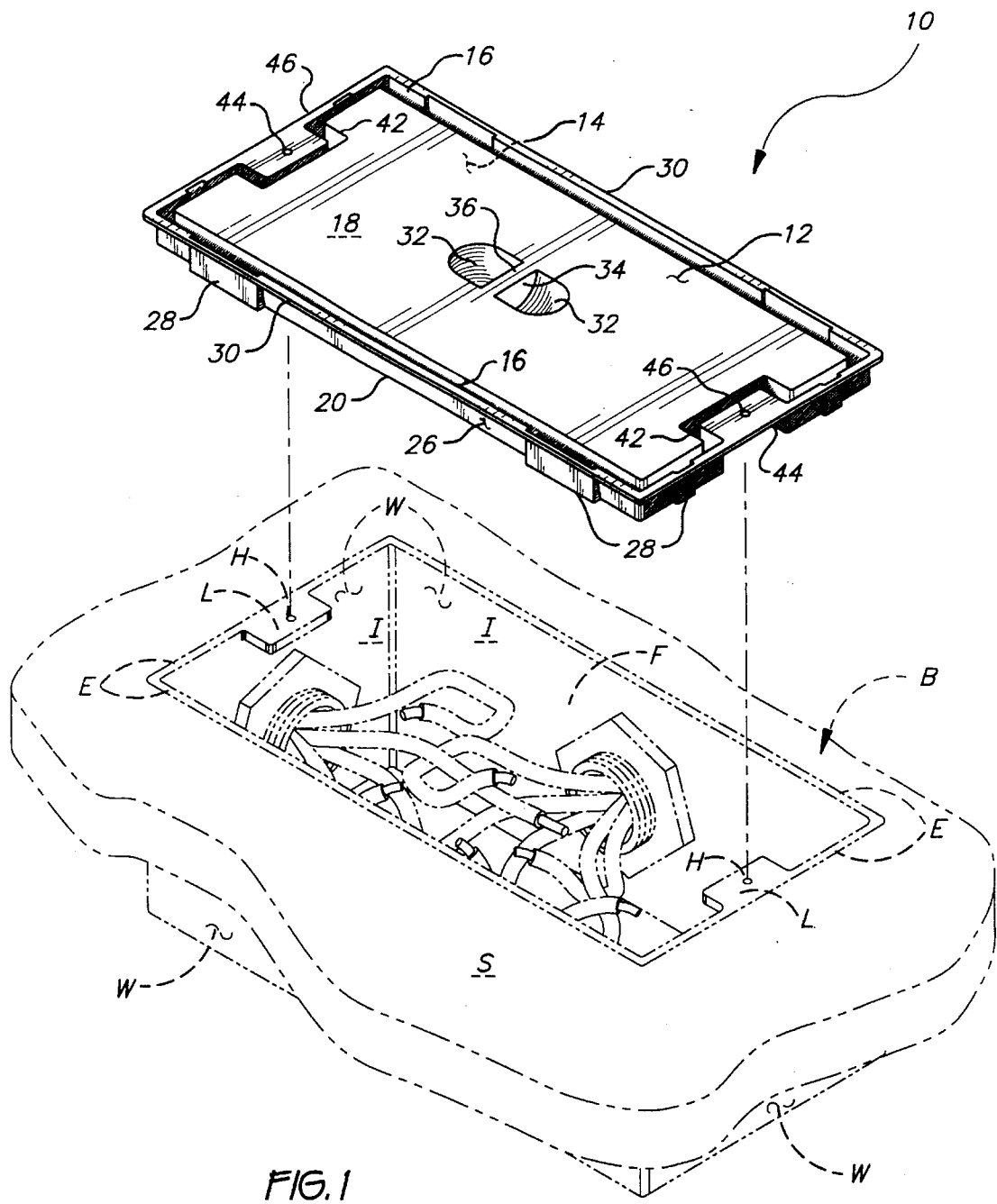
FIG. 1 is a perspective view of the present temporary electrical box cover, showing its various features and installation to an existing electrical receptacle or switch box shown in broken lines.
Figure 2:
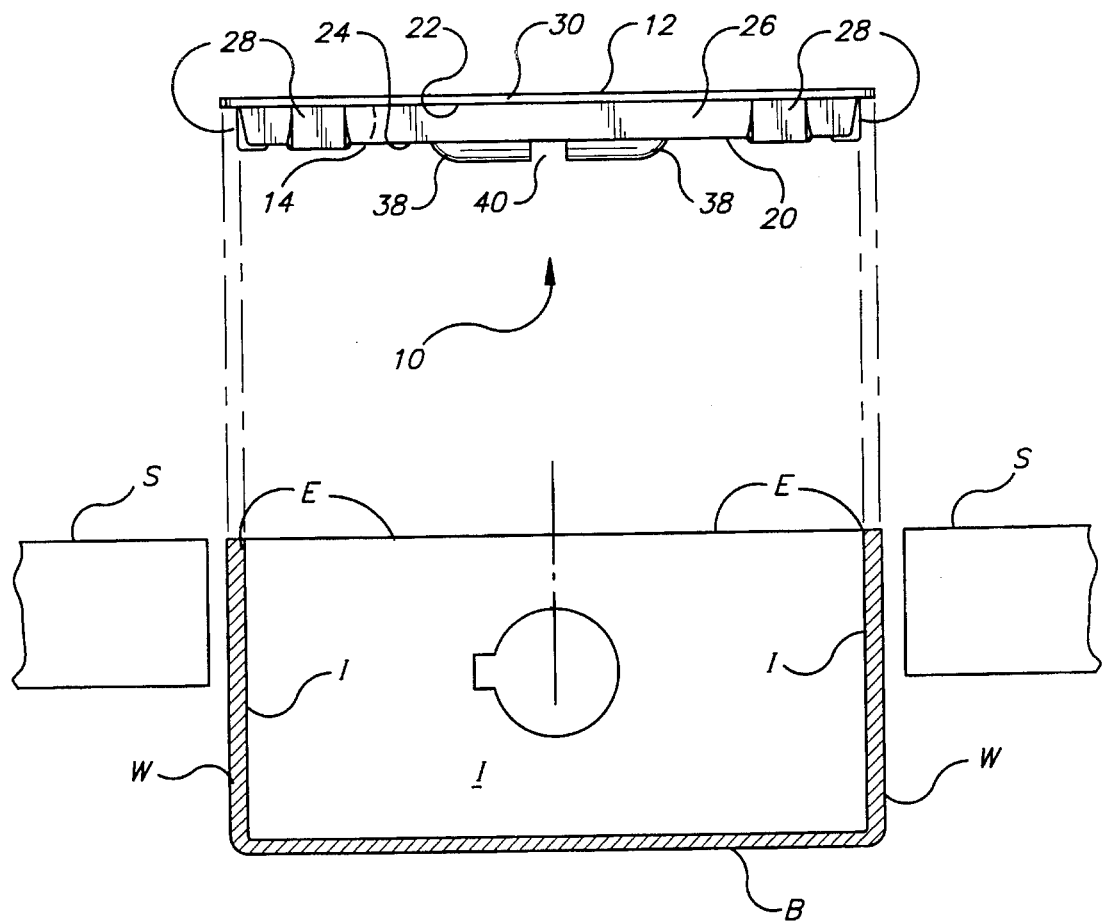
FIG. 2 is an elevation view of the present temporary cover, showing its installation to an electrical box (shown in section).

Referring now particularly to FIGS. 1 and 2 of the drawings, the present invention will be seen to relate to a temporarily installable and removable, disposable electrical switch or outlet box cover 10, providing for the protection of an electrical box B (shown in broken lines in FIG. 1) during finishing construction work. Typically, such boxes B are used to contain terminals for electrical receptacles, light and other electrical switches, etc. Conventional boxes B, with which the present cover 10 is specifically adapted for use, typically include at least four side panels or walls W, with the inner surfaces I of the walls W defining a volume therein for the containment of wiring and electrical components. Such boxes B also typically have an open front F defined by the outer edges E of the walls W. Typically, two opposite walls include inwardly extending lugs L providing for the attachment of electrical switches, receptacles or the like thereto. Such boxes B are particularly adapted for installation so that the outer edges E lie flush with the surrounding interior wall surface S in which the box B is installed.

The cover 10 is preferably formed of a single, unitary sheet of relatively thin material (e.g., 0.01 to 0.02 inch thick; other thicknesses may be used) which is devoid of openings or passages therethrough, in order to completely protect the interior of an electrical box B to which the present cover 10 may be applied. The thin sheet material of cover 10 includes an outer surface 12 and an opposite inner surface 14 (shown more clearly in the edge elevation view of FIG. 2). The outer surface 12 includes a channel 16 formed therein, with the channel 16 forming a boundary about a central area 18. The opposite inner surface 14 includes a flange 20 extending therefrom and corresponding to the channel 16 formed in the outer surface 12. The flange 20 is sized and adapted to fit closely within the interior walls W of a standard, conventional electrical box B.

Preferably, the flange 20 has a tapered cross section, with a base 22 which is wider than he flange apex 24, as shown in FIG. 2. The taper of the flange 20 eases insertion of the cover 10 into the front opening F of an electrical box B. However, the outer face 26 of the flange 20 (i.e., the face adjacent to the edges of the inner walls I of an electrical box B when the present cover 10 is installed therein) may also include a plurality of protruding surfaces 28, which surfaces 28 are normal to the inner surface 14 of the cover 10. The protruding surfaces 28 are specifically spaced and adapted to engage frictionally with the inner surfaces I of the electrical box side walls W, thereby holding the cover 10 in place over the front opening F of the box B when the cover 10 is temporarily installed thereon. Preferably, such protruding electrical box engaging surfaces 28 are evenly spaced near the corners of the flange 20; other arrangements may be used.

To preclude installation of the cover 10 into the interior of the electrical box B to too great a depth, the outer surface of the flange base has a flat peripheral edge 30 extending outwardly therefrom. The edge 30 is coplanar with the central area 18 of the cover 10, and has a width extending outwardly past the flange base 22, which is substantially equal to the thickness of each of the edges E of the electrical box walls W. Thus, when the present electrical box cover 10 is inserted into the front opening F of a conventional electrical box B, the peripheral edge 30 abuts the corresponding edges E of the electrical box walls W, to preclude excessively deep insertion into the box B. As the edge 30 of the cover 10 abuts the electrical box wall edges E, the cover 10 extends outwardly from the box only an insignificant amount equal only to the thickness of the cover sheet material, or some 0.01 to 0.02 inch. Thus, the present cover 10 lies substantially flush with the wall surface W, and plastering or joint compound work may be easily accomplished without interference with an installed cover 10.

Preferably, the central area 18 of the cover 10 includes finger gripping means therein, comprising two generally hemispherical depression 32 formed in the outer surface 12, with the depression 32 having a finger grip 34 extending across. The finger grip 34 has an upper surface 36 which is coplanar with the upper or outer surface 12 of the cover 10. (It will be seen that, due to the very thin nature of the sheet material used to form the cover 10, that the depression 32 in the upper surface corresponds to a generally hemispherical protuberance 38 extending from the inner surface 14 of the cover 10, as shown in FIG. 2. The finger grip 34 corresponds similarly to a slot 40 across the protuberance 38 of the inner surface 14.)

Thus, the present electrical box cover 10 may be removed easily from its frictional engagement with the inner surfaces I of the box side walls W, by gripping the finger grip 34 and pulling the cover from the electrical box B. As no part of the grip means extends above or beyond the upper surface 12 of the cover 10, joint compound and plaster work is not impeded by the present cover 10.

The present cover 10 includes opposite offsets 42 in the sides of the channel 16/flange 20, providing clearance for the conventional electrical switch or receptacle attachment lugs L which normally extend inwardly from the edges E of opposite walls W of an electrical box B. The flange/channel offsets 42 each include a lug cover 44 spanning the space defined by the respective offset 42, with each lug cover 44 including a fastener locating dimple 46 therein. Thus, when the present cover 10 is installed in a conventional electrical box B, the flange offsets 42 provide clearance around the box lugs L to enable the cover flange 20 to fit completely between the box walls W, so that the cover central area 18 and peripheral edge 30 are substantially even with the surrounding wall surface S. The lug covers 44 serve to preclude intrusion of joint compound, plaster or the like into the threaded electrical component attachment holes H conventionally placed in the lugs L of the electrical box B. The dimples 46 in the lug covers 44 are positioned to align with the attachment holes H, and may be punched through, if desired, to allow the present cover 10 to be mechanically installed to the electrical box lugs L, e.g. by screws, etc. through the lug covers 44 and into the attachment holes H. Such mechanical attachment of the cover 10 to the electrical box B provides additional security for the cover 10, which may be desirable in certain circumstances.

Figure 3:
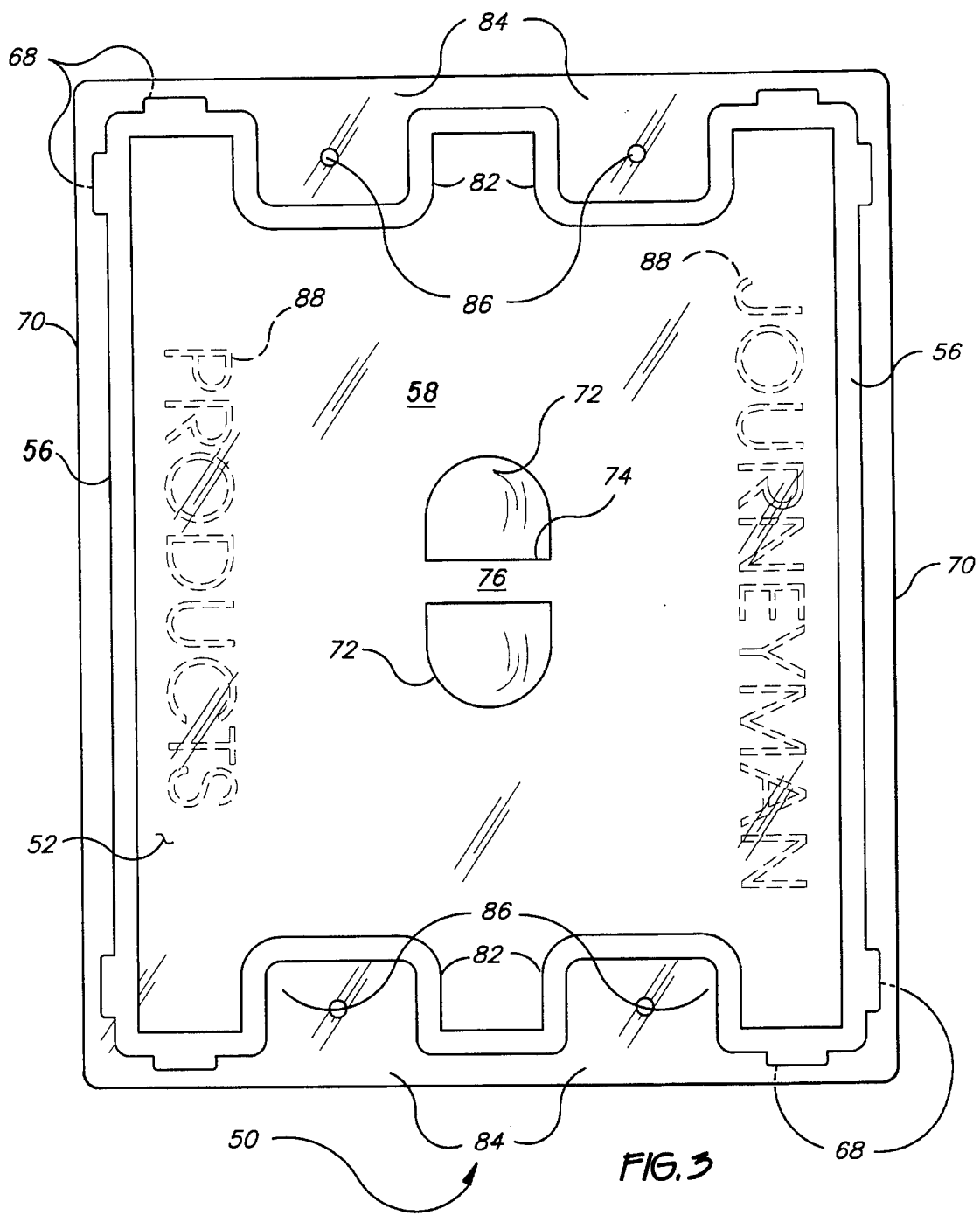
FIG. 3 is a plan view of a second embodiment of the present electrical box cover, showing various alternate features and adapted to fit a double width electrical box.

FIG. 3 discloses an alternate embodiment of the present cover 10, designated 50. The temporary electrical box cover 50 of FIG. 3 is formed similarly to the cover 10 discussed above, and includes most of the same features. However, the cover 50 is configured and adapted to fit closely the front opening of a double width electrical box (not shown), in the manner of the cover 10 and a single box B as discussed above. Such boxes are conventionally substantially twice the width of the electrical box B of FIGS. 1 and 2, providing for the side by side installation of two sets of electrical receptacles, or two switches, or a combination thereof, within the box. Accordingly, such boxes have the same height and depth as the conventional box B discussed above, but are twice as wide and the opposite walls thereof each include two electrical component attachment lugs.

Cover 50 includes an outer surface 52, an opposite inner surface (not shown), a channel 56 surrounding a central area 58 flange 60, and the various flange features and components (not shown) corresponding to those features and components of the cover 10 of FIGS. 1 and 2. A protruding surface 68 extends from a plurality of locations about the flange 60, as in the cover 10 of FIGS. 1 and 2. A peripheral edge 70 also extends outwardly from the channel 56 and flange 60, as in cover 10. Generally hemispherical depressions 72 are also provided in the outer surface 52, with the depressions 72 divided by a finger grip 74. The grip 74 has an upper surface 76 which is coplanar with the upper or outer surface 52 of the cover 50. Thus, it will be seen that the above components comprising features of the second embodiment cover 50, correspond to like features of the first embodiment cover 10 of FIGS. 1 and 2 discussed above.

However, it will be seen that due to the double width of the cover 50, two channel offsets 82 are provided in each of two opposite sides of the channel 56, for a total of four offsets 82. These four offsets 82 correspond to the four electrical component attachment lugs conventionally found with double width electrical boxes, and providing for the installation of two electrical components therein. Thus, the four offsets 82 of the double width cover 50 provide clearance for the four lugs of a double width electrical box, enabling the cover 50 to seat within the walls of such a box and for the central area 58 and the peripheral edge 70 of the cover 50 to lie substantially flush with a wall surface in which the double width box is installed.

The offsets 82 each include a lug cover 84 spanning each respective offset 82, as in he offsets 42 and lug covers 44 of the cover 10 discussed above. The lug covers 84 serve the same purpose, i.e., to prevent incursion of foreign matter (plaster or joint compound, etc.) into the threaded screw holes of the lugs. Each of the lug covers 84 may also include a fastener locating dimple 86 therein, in the manner of the dimples 46 of the cover 10. Again, the dimples 86 serve the same purpose for cover 50 as the corresponding dimples 46 of cover 10, to provide for the location of attachment screws or the like in the event it is desired to secure the cover 50 to a double width electrical box, by mechanical means. It will further be noted that although only two embodiments of the present invention are specifically disclosed herein, that the present covers lend themselves to further variations adaptable to various configurations and shapes of electrical boxes. The principle remains constant, however, with the covers frictionally fitting within the boxes to seal them from foreign matter.

The various embodiments of the present covers 10/50 are preferably formed of a relatively thin sheet material, as discussed above. The use of thin, thermosetting plastic sheet for the present covers 10/50 lends itself well to the vacuforming process. The sheet materials used, and the resulting covers 10/50, may be opaque (as with cover 10), translucent, or transparent (as shown with the cover 50 of FIG. 3), as desired. The use of transparent plastic sheet for the construction of covers 10/50 will be seen to provide some advantage under certain circumstances, as the contents of the underlying electrical box may be readily observed without removal of the cover 10/50, assuming the cover has not yet been covered with joint compound or the like.

It will be noted that the above construction results in covers 10/50 which are quite inexpensive, thus providing for a single use and disposal immediately thereafter. In the event that the present cover 10 or 50 is completely covered with material, rendering the grip 34/74 inaccessible, the cover 10/50 may be broken free from the underlying electrical box without concern, as it is intended that the cover 10/50 be discarded after a single use in any event; cleaning of the cover 10/50 for reuse would be uneconomical, given the very low cost of producing such covers 10/50.

The flat outer or upper surface 12/52 of the covers 10/50 lends itself to the inclusion of a message 88 thereon, as shown on the cover 50 of FIG. 3. The message may be in the form of advertising stamped or embossed into the central area 18/58, or other message means as desired, e.g., instructions for use, etc. Alternatively, the central area 18/58 may be used for the user to note details of the wiring within the corresponding electrical box, or other information as desired.

Accordingly, the present covers 10/50, and other embodiments within the scope of the accompanying claims, provide a quick and efficient means of precluding incursion of foreign matter, i.e., joint compound, plaster, etc., into an installed electrical outlet or switch box during finishing work on the wall surfaces in which the box is installed. The covers 10/50 may simply be pressed into position on the corresponding sized box over the box opening, whereupon the covers 10/50 will lie substantially coplanar with the wall surface with only the relatively thin thickness of the sheet material protruding from the electrical box opening and the wall surrounding the box. Alternatively, the covers 10/50 may be mechanically secured to the box lugs for greater security if desired, by punching out the dimples 46/86 and securing the covers 1/50 in place through the lug covers 44/84 with screws.

Thus, finishing plaster or joint compound work may be quickly and easily accomplished due to the lack of outward protrusions and extensions from the cover, which otherwise must be worked around. When the work is completed, the covers 10/50 may be easily removed by means of the grip 34/74, and the cover 10/50 discarded. The underlying electrical box from which the cover 10/50 was removed, remains clear of foreign matter and enables efficient completion of electrical work therein without need to remove hardened compound or the like from the interior of the electrical box.

It is to be understood that the present invention is not limited to the sole embodiments described above, but encompasses any and all embodiments within the scope of the following claims.

I claim:

1. A temporary cover for an electrical outlet box, with the outlet box including at least four outlet box walls formed of flat panels having inner surfaces and outer edges defining a front opening thereto, and further including at least two oppositely spaced electrical component attachment lugs extending inwardly therefrom, with each of the lugs including a screw hole therethrough, and with the outlet boxes outer edges adapted to lie substantially flush with a structural wall surface when the outlet box is installed therein, said temporary cover comprising:

a unitary, thin, continuous, and unbroken sheet of plastic material having a central area, an outer surface, and an opposite inner surface, with said sheet of material adapted to cover completely the front opening of the electrical outlet box to which said cover is temporarily installed;

said central area includes a gripping means comprising a pair of spaced apart hemispherical depressions formed in said outer surface and a corresponding pair of spaced apart protrusions extending from said inner surface to define said outer surface depressions, with said depressions in said outer surface having a finger grip extending across, with said finger grip having an upper surface coplanar with the outer surface of said cover, whereby a user's fingers are inserted into said hemispherical depressions to grip and withdraw said cover from the protected electrical box; and said outer surface of said cover being devoid of protrusions extending therefrom, and containing a channel formed coextensively with a flange completely surrounding said central area of said inner surface, said flange having a tapered cross-section, and adapted to engage frictionally the inner surfaces of the walls of the electrical outlet box at at least a plurality of points by protruding flange surfaces normal to said inner surface of said cover;

whereby said cover is temporarily installed to cover the front opening of the electrical outlet box by means of the protruding surfaces of said flange frictionally engaging the inner wall surfaces of the electrical outlet box, thereby precluding contamination of the interior of the electrical outlet box by plaster, wallboard joint compound, and other contaminants at the time the wall surface is finished.

2. The temporary electrical box cover of claim 1, wherein said plastic cover is configured and adapted to fit closely the front opening of a double width electrical box.

3. The temporary electrical box cover of claim 1, wherein said plastic cover is translucent.

4. The temporary electrical box cover of claim 1, wherein:

said flange includes at least two oppositely spaced offsets adapted to pass around the at least two attachment lugs of the electrical box when said plastic cover is temporarily installed thereon.

5. The temporary electrical box cover of claim 1, wherein:

said plastic cover includes a flat periphery extending outwardly from said flange, with said periphery being coplanar with said central area and adapted to extend across the edges of the outlet box walls.

6. The temporary electrical box cover of claim 5, wherein:

said periphery includes at least two lug covers adapted to cover the screw holes of the electrical component attachment lugs of the electrical box when said, cover is temporarily installed thereon.

7. The temporary electrical box cover of claim 6, wherein:

said lug covers each include a locating dimple therein, adapted to be positioned over the screw holes of the electrical box attachment lugs, whereby;

each said locating dimple provides means for locating a hole through said lug covers to provide for screw attachment of said cover to the attachment lugs of the electrical box.

8. The temporary electrical box cover of claim 1, wherein:

said cover is formed of an opaque plastic sheet of material.

9. The temporary electrical box cover of claim 1, wherein:

said cover is formed of a transparent plastic sheet of material.

10. The temporary electrical box cover of claim 1, wherein:

said plastic cover includes message means thereon.

11. The temporary electrical box cover of claim 1, wherein:

said plastic cover is disposable, thereby providing for the economical disposal thereof after a single use.

* * * * *